United States Patent Office 3,405,084
Patented Oct. 8, 1968

3,405,084
NEUTRALIZED TERPOLYMERIC RESIN OF VINYL PYRROLIDONE, ALKYL ACRYLATE OR METHACRYLATE, AND UNSATURATED MONOCARBOXYLIC ACID
Stanley Bohac, Chicago, and Morris J. Root, Highland Park, Ill., assignors to G. Barr Company, Division of Pittsburgh Railways Company, Niles, Ill., a corporation of Pennsylvania
No Drawing. Filed June 30, 1965, Ser. No. 468,568
6 Claims. (Cl. 260—29.6)

ABSTRACT OF THE DISCLOSURE

A terpolymeric resin of 25% to 75% by weight vinyl pyrrolidone, 20% to 70% acrylate and 3% to 25% unsaturated acid, said resin being especially useful as a hair spray because of its solubility in alcohol or water, hardness for easier combability, nonhygroscopicity and luster.

---

This invention relates to a novel type of synthetic resin and more particularly to a terpolymer of vinyl pyrrolidone, an acrylate and an unsaturated acid, particularly suitable for use in a novel hair fixative composition, to which this invention pertains, but this resin can be also used for other purposes.

One of the basic requirements for a good hair fixative is water solubility, or at least shampoo washability, yet it should have minimum humidity pick-up while it resides on the hair. This combination of requirements is hard to attain since they are directly proportional to each other. Higher water solubility causes higher humidity pick-up and vice versa. The relative humidity of the atmosphere must, however, be considered. While low relative humidity may cause only low humidity pick-up and vice versa, there are, unfortunately, very few areas where low relative humidity exists as a rule. Most of the time, the humidity is high enough to cause an adverse effect.

Ancillary to the above problem is the hardness of the resultant resin. It is desirable to have a hard resin for easy combability. A harder resin breaks easier. But the relative humidity also affects such hardness. Where the initial hardness is too low, or where the rate of decrease in hardness to stickiness is high, the effect of relative humidity will be greater. It is, therefore, desirable to obtain a resin which is initially hard and which is not rapidly adversely affected by relative humidity changes.

The trade has made many attempts to accomplish all of these desirable objectives. Currently, there are two approaches: (1) synthesize a resin which inherently has the desired characteristics, (2) synthesize a resin having reactive groups which can be reacted with other components to accomplish the desired characteristics.

In the first approach, the trade has resorted to copolymerization for its resin. As an example, instead of polyvinyl pyrrolidone, the copolymer of N-vinyl pyrrolidone-vinyl acetate has been devised (see U.S. Patent 3,171,784) to overcome the undesirable attributes of said polyvinyl pyrrolidone or even vinyl acetate alone. Vinyl pyrrolidone yields only a completely water soluble resin which has high humidity absorption while vinyl acetate alone yields only a water insoluble resin. By polymerizing both monomers together, in a certain proportion, a water soluble resin is still obtained. By increasing the vinyl acetate content, the water solubility decreases. Thus the high absorption of humidity from the air can be advantageously altered.

In the second approach, another copolymer was devised, such as, for example, vinyl acetate-crotonic acid (see U.S. Patent 2,996,471) which, although initially water insoluble, after neutralization of its carboxylic groups, usually with an amino alcohol, became water soluble. Within certain narrow limits, it was possible to adjust the water solubility of the resin by different percentage neutralization of the carboxylic groups. While this was desirable, there was still the problem of adjustment to the proper level.

The trade has continued to seek an optimum resin, but has, up to now, failed to discover one. Examples of such effort are seen in U.S. Patent 2,897,172, which suggests a partially hydrolyzed acrylic ester, in U.S. Patent 2,948,656, which suggests a ring substituted N-vinyl-2-oxazolidinone polymer, in U.S. Patent 2,953,498, which suggests a polyvinyl imidazole, in U.S. Patent 2,956,927, which suggests a 5-position substituted hydantoin-formaldehyde resin, and in U.S. Patent 3,026,250, which suggests a copolymer of an unsaturated ester and an amine containing monomer.

In all such activity, the prime problem has been in the copolymer. As is well known, a copolymer is a mixture of macromolecules containing both monomeric moieties in different ratios. These macromolecules determine the end characteristics of the resin.

In most instances, it is extremely difficult to repeatedly make the exact same macromolecules or distributions thereof. The resin should, at most, have only narrow variation in monomer ratio in each macromolecule to effect a uniform product. From this, it should be evident that the past efforts of the trade assumed a very difficult task in the approach taken.

An object of this invention is to provide a novel resin.

Another object is to provide a resin comprising three monomers which uniquely coact to accomplish the desired objectives of a hair spray.

Still another object is to obtain resin with more uniform characteristics, which is extremely important for hair fixative usage.

A further object is to provide a resin which is soluble in anhydrous alcohol, and can be made water soluble by neutralization.

A still further object is to provide a resin which has adjustable water solubility so that dispersity to complete dissolution in water is possible by simple neutralization.

Another object is to provide a resin whose characteristics may be changed by the mere expedient of neutralizing some or all of its reactive groups.

Another object is to provide a resin wherein by formulation the hardness can be varied.

Another object is to provide a resin which is relatively hard whereby greater frangibility will be effected. Such frangibility permits easy breakage and therefore, as a fixative for hair, will permit easy combing thereof.

Another object is to provide a resin which is hard, said hardness being subject to only slight change by humidity.

Another object is to provide a resin which can be formulated into a crystal clear resin.

Still another object is to provide a resin which can be formulated to make a lustrous film when applied to a surface, such as a hair fiber.

Another object is to provide a resin which, because of the above and other characteristics, is extremely useful as a hair fixative.

A still further object is to provide a resin which has minimum flaking tendencies during combing when applied to hair.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

A resin has now been found which has unique physical and chemical characteristics making it especially useful as a hair fixative. The resin, in its broadest scope, comprises a terpolymer of vinyl pyrrolidone, an ester selected from the class consisting of the straight and branched chain lower alkyl acrylates and methacrylates, and a short chain unsaturated acid such as an acrylic acid. Specific amounts of the indicated monomers are polymerized and subsequently formulated into a hair fixative of desired characteristics by neutralization to adjust its properties and clarity as well as its water solubility.

For a fuller understanding of the nature and objects of the invention, reference should be had to the following detailed examples of synthesis of the terpolymer, and formulation into a hair fixative composition.

In all the examples below, it should be understood that the specific conditions, amounts and the like, as well as the inhibitors, etc. may be varied somewhat or even completely eliminiated in certain instances, and the values given are approximately those obtainable under the conditions specified.

EXAMPLE I

Into 958 parts of anhydrous alcohol, add 8 parts of azodiisobutyronitrile which is the catalyst, and mix. To this solution of dissolved catalyst add 499 parts of N-vinyl pyrrolidone (preferably stabilized with 0.1% flake caustic soda). After mixing, add 61 parts of glacial methacrylic acid (preferably containing 250 p.p.m. of monomethyl ether of hydroquinone), and then stir the mixture again. Then 218 parts of ethyl methacrylate (preferably containing 100 p.p.m. of hydroquinone) is added.

A four-liter glass reaction kettle, preheated to 80° C. and equipped with slow-speed stirrer, cooling condenser, nitrogen inlet, thermometer, flow-meter, and water bath with controlled temperature heating, is washed with nitrogen and then one half of the solution of dissolved catalyst and monomers in anhydrous alcohol inserted therein. The temperature of the polymerization solution is increased, and, when it reaches 70° C., no further heating is required. The temperature will thereafter increase, by itself, to the boiling point of the mixture. If necessary, the reaction kettle may be cooled by replacing the hot water in the water bath with cold water.

When reflux of the condensed vapor begins, addition of the second half of the initial solution is commenced through the flow meter at a speed of 100 parts per ten minutes. It will be noted that the temperature of the reaction mixture during this period slowly decreases with small variations. When the temperature has decreased to 78° C., keep it at this level.

After one hour, and again after four hours, add a solution of 1 part of additional catalyst in 78.5 parts of anhydrous alcohol to insure complete polymerization.

The combined mixture is then heated until about 11 hours have passed from initiation of the synthesis. Then, 118 parts of anhydrous alcohol is added to obtain a 40% solution (approximately) of resin in anhydrous alcohol. Its properties will be much like the following properties of a solution of resin made in accordance with the above instructions.

Form: 40% solution, wt./wt., in anhydrous alcohol (SDA 40),
Color: 2 max. Gardner color standard,
Viscosity: 1800 cps. at 25° C.,
Acid No.: 50 (based on solids basis),
Specific gravity: 0.927 gm./ml. at 21° C.,
Moisture content: 0.2% wt./wt.,
Unsaturation: 0.2% (as monomers, on solution),
Hardness: 64 (Sward hardness rocker, 3 mil film),
Value of pH: 6.5 (2.7% solids in anhydrous alcohol),
Solubility: Unneutralized resin is completely soluble in anhydrous alcohol. Neutralized resin is soluble in water and alcohol.

The above resin may be subjected to various treatments, such as neutralization.

2-amino-2-methyl-1,3-propanediol (AMPD) is the preferred neutralizer. However, other neutralizers, such as 2-amino-2-methyl-propanol (AMP), 2 - amino-2-ethyl-1,3-propanediol (AEPD) and di(methoxyethyl)amine may also be used.

In neutralizing the resin, it is preferred that the neutralizing compound is slowly added to the solution of resin. Such procedure and slow addition insures partial neutralization of each macromolecule. Partial neutralization is desired to avoid a cloudy film when the resin is used as a hair fixative. By limiting the degree of neutralization, one minimizes atmospheric moisture pick-up. Hence, selective balancing of the desired results should be taken into account.

The following table indicates neutralization amounts needed:

TABLE I
[Neutralization of 100 gms. of 40% resin]

| Neutralization, percent: | AMPD, gm. |
|---|---|
| 50 | 1.88 |
| 60 | 2.25 |
| 70 | 2.62 |
| 80 | 3.00 |
| 90 | 3.38 |
| 100 | 3.75 |

It should be noted that the minimum percentage of neutralization using 2-amino-2-methyl-1,3-propanediol. This AMPD.

It is found that the solubility of the resin, from dispersity to complete water solubility, may be regulated by varying the degree of neutralization by the procedure mentioned above. Surprisingly, such variation has no effect upon the solubility of the resin in alcohol, which remains completely soluble therein.

The value of pH of an alcoholic solution (2.7% solids) of the resin changes from 6.5 to 8.5 from 0 to 100% neutralization using 2-amino-2-methyl-1,3-propanediol. This relatively narrow change is most desirable in a hair fixative composition especially in aerosol work.

This value of pH, using different neutralizing agent, can be slightly different, because of its different alkalinity. So, for example, using 2-amino-2-methyl-propanol, the value of pH of the 2.7% solids of resin in alcoholic solution varies from 6.5 to 8.7 from 0 to 100% neutralization.

The hardness of a dried film of the above resin was determined and tested against other hair spray formulations. The film was 3 mil thick, and then dried for three days at room temperature in 50–55% relative humidity. As seen in Table II, its hardness is substantially greater than any resin currently used as a hair fixative. And this is accomplished without adverse amount of flaking upon combing of the hair.

TABLE II
Hardness

| Composition: | Sward hardness |
|---|---|
| (a) Resin only: | |
| Film 1—Example I resin, 90% neutralized | 62 |
| Film 2—Example I resin, 45% neutralized | 64 |
| Film 3—Example I resin, 0% neutralized | 66 |
| Film 4—70% vinyl pyrrolidone, 30% vinyl acetate | 54 |
| Film 5—90% vinyl acetate, 10% crotonic acid, 70% neutralized | 28 |
| (b) Hair spray formulation: | |
| From 1 above | 54 |
| From 2 above | 58 |
| From 4 above | 42 |
| From 5 above | 26 |

It might also be noted that the Sward hardness changed only from 66 to 60 with a change of 0 to 100% in neutralization of the resin.

It must be emphasized that the hardness of a hair fixative film is most important with respect to combability of the hair. A film of harder resin is easier to break and thus the hair is easier to comb.

When samples of the above resin, neutralized to varying degrees (10 to 90%) and/or formulated with 35 and 50% alcohol with propellant, are tested for corrosion by maintaining samples thereof in customary 3-piece aerosol cans at 120° F. for a period of six months, no changes in conductivity, pH, color or odor, or can appearance are observed. This indicates that the resin is noncorrosive—a highly desirable attribute to an aerosol packager.

Typical hair spray formulations are as follows:

Regular hair spray

Concentrate; gm.:
  7.50 40% alcohol solution of unneutralized resin.
  0.22 AMPD.
  0.10 silicone.
  0.10 to 0.30 perfume oil.
  92.08 anhydrous alcohol.
Fill, percent:
  35 concentrate.
  65 propellant comprising 35 parts of dichlorodifluoromethane and 65 parts of trichloromonofluoromethane.

Hard-to-hold hair spray

Concentrate, gm.:
  7.50 40% alcohol solution of 50% neutralized resin.
  0.10 silicone.
  0.10 to 0.30 perfume oil.
  92.30 anhydrous alcohol.
Fill, percent:
  35 concentrate.
  65 propellant comprising 35 parts of dichlorodifluoromethane and 65 parts of trichloromonofluoromethane.

EXAMPLE II

A mixture of 124.5 parts of N-vinyl pyrrolidone (preferably inhibited with 0.1% flaked caustic soda), 24.9 parts of glacial acrylic acid (preferably inhibited with 200 p.p.m. monomethyl ether of hydroquinone (MEHQ)), and 138 parts ethyl acrylate (preferably inhibited with 15 p.p.m. of MEHQ) is polymerized in a 2000 ml. glass reactor, equipped as in Example I and following the same procedure, using 3 parts of azodiisobutyronitrile as catalyst, and 306 parts of anhydrous alcohol as solvent. Then 0.3 part of catalyst in 23.5 parts of anhydrous alcohol is added twice as in Example I. Heating and stirring is continued for eight hours. Subsequently, 150 parts of anhydrous alcohol are added to obtain a 40% solution of the resin. The solution will have a viscosity of 1.540 cps. at 24° C. The Sward hardness of a film of 90% neutralized resin with triethanolamine is 40.

The above resin is formulated into a hair spray composition by dissolving 31 parts of a 90% neutralized resin in 969 parts of anhydrous alcohol to which perfume and plasticizer are added in the usual amounts. This solution is used to fill aerosol cans along with propellant, 35% dichlorodifluoromethane–65% trichloromonofluoromethane, at a 35%–65% resin concentrate propellant ratio.

Film, made by spraying such a mixture on a glass plate, will be hard, clear, and completely soluble in water.

EXAMPLE III

One half of a mixture of 143 parts of N-vinyl pyrrolidone (preferably inhibited with 0.1% flaked caustic soda), 28 parts of glacial methacrylic acid (preferably inhibited with 250 p.p.m. MEHQ), and 97.8 parts of butyl methacrylate (preferably inhibited with 0.01% hydroquinone), along with 3 parts of azodiisobutyronitrile, and 214 parts of anhydrous alcohol is poured into equipment similar to that used in Example II. The equipment is first preheated and washed with nitrogen.

When the reaction mixture reaches its boiling point, the second half is added at a rate which requires a total of 55 minutes. Then, 0.3 part of additional catalyst in 30 parts of anhydrous alcohol is added after one, and again, after two hours. The reaction is allowed to proceed for several additional hours. Then the percent solids is adjusted to 40%. The viscosity of the resultant solution is 2600 cps. at 25° C.

100 parts of the 40% solution are neutralized with 4.6 parts of 2-amino-2-methyl-1,3-propanediol in 11.5 parts of anhydrous alcohol.

As a dried film, made by the same procedure for hardness testing as in Example I, the Sward hardness of this neutralized resin is 50.

To formulate into a hair spray, 4% of the neutralized resin in anhydrous alcohol and in a ratio of 30% alcoholic solution and 70% propellant is sealed in an aerosol container. Use of the spray will produce a clear, hard film on glass which is completely soluble in water.

EXAMPLE IV

One half of a mixture of 233 parts of anhydrous alcohol, 3 parts of azodiisobutyronitrile, 152 parts of N-vinyl pyrrolidone (preferably inhibited with 0.1% flaked caustic soda), 32.4 parts of glacial acrylic acid (preferably inhibited with 0.02% of MEHQ), and 108 parts of hexyl methacrylate (preferably inhibited with 100 p.p.m. HQ) is poured into equipment similar to that of Example II, and the same procedure utilized to initiate polymerization. Thirty minutes after the start of the reaction, the balance of the mixture is added over a 65 minute addition period. One and one-half hours, and again four hours, after the addition is complete, 0.3 part of catalyst in 30 parts of anhydrous alcohol is added. The reaction is allowed to proceed for several additional hours.

The viscosity of a 40% solution of the resultant resin is 1740 cps. at 25° C.

The solution is 100% neutralized with di(methoxyethyl)amine. Sward hardness, obtained as in Example I, of a dried film is 52.

To formulate into a hair spray, 2.4 parts of this neutralized resin are dissolved in anhydrous alcohol to obtain 35 parts of an alcoholic concentrate. This is inserted into an aerosol can along with 65 parts of a propellant mixture (35% dichlorodifluoromethane and 65% trichloromonofluoromethane). Film sprayed from the can will be clear, hard, and washable with shampoo.

EXAMPLE V

To 235 parts of anhydrous alcohol add 4.5 parts of azodiisobutyronitrile, 145.5 parts of N-vinyl pyrrolidone (preferably stabilized with 0.1% flake caustic soda), 45.6 parts of glacial methacrylic acid (preferably containing 100 p.p.m. of MEHQ), and 106.2 parts of butyl acrylate (preferably containing 50 p.p.m. of MEHQ). One half of this mixture is poured into the same equipment used in Example II and the same procedure followed to initiate the polymerization. When the reaction mixture reaches the boiling point, the second half of the solution is added over a period of 50 minutes. Then one hour, and again, three hours after the completion of the addition of the second half of the initial solution, 0.1 part of a catalyst in 10 parts of anyhdrous alcohol is added. Heating and mixing is then continued for several hours. Viscosity of this product at 40% solids is 2.700 cps. at 24° C. The 70% neutralizer solution of resin, which has a Sward hardness of 44, is dissolved in anhydrous alcohol to obtain 2.4% solids. 35 parts of this concentrate is filled and sealed in an aerosol can with 65 parts of a mixture of 35% dichlorodifluoromethane and 65% trichloromonofluoromethane. Film sprayed from the can will be clear, hard, and soluble in water.

The resin of this invention may be varied in its monomer makeup as follows:

The vinyl pyrrolidone content may vary from 25 to

75% by weight, the preferred content being 60% by weight.

The acrylate ester may comprise an acrylate selected from the class consisting of the straight and branched $C_1$ to $C_{10}$ alkyl, cycloalkyl and aryl acrylates and methacrylates. Specifically, it may comprise methyl acrylate, ethyl acrylate, propyl acrylate, isopropyl acrylate, butyl acrylate, iso-butyl acrylate, methyl methacrylate, ethyl methacrylate, propyl methacrylate, iso-propyl methacrylate, butyl methacrylate, isobutyl methacrylate, hexyl methacrylate, octyl methacrylate, decyl methacrylate and the like. The content of the acrylate ester may vary from 20% to 70% by weight, the preferred amount being 30% by weight.

The acid used may comprise an unsaturated acid such as an acrylic acid and specifically acrylic acid and methacrylic acid. Its content in the finished resin may range from 3 to 25% by weight, preferably 10%.

Any reaction solvent may be used, such as alcohols; specifically methyl, ethyl, propyl or butyl alcohol, esters; specifically, ethyl, or butyl acetate, and ketones; specifically, methyl ethyl ketone and the like.

The usual polymerization catalysts may be used to polymerize the above three monomers into the terpolymer of this invention, typically azodiisobutyronitrile.

Many neutralization agents may be used. Typical are 2-amino-2-methyl-1,3-propanediol (AMPD), 2-amino-2-ethyl-1,3-propanediol (AEPD), and di(methoxyethyl)-amine (DMA), and triethanolamine (TEA).

The finished resin may take various physical forms; namely, a dried product, a viscous liquid, a solution, or even a spray dried fluffy product. In most instances above, the alcoholic solution was preferred because of the nature of the product to be formulated therefrom. However, it should be understood that any technique currently known for creating a desirable physical form of product could have been used.

In formulating hair fixative compositions useing the resin of this invention, the first consideration is the type of fixative desired. It may be an aqueous or alcoholic solution, a mechanical or pressurized sprayable solution, or a bar which may be rubbed along the length of a hair strand.

Recently, use of a pressurized solution has become most popular. In such formulation, the resin comprises 2 to 10% solids by weight in an aqueous, alcoholic, or mixed aqueous alcoholic solution (10 to 98% by weight) in admixture with a liquid or gaseous propellant (condensable gases) such as a fluorocarbon, hydrocarbon, nitrogen, nitrous oxide, carbon dioxide, and the like (98 to 2% by weight). The preferred propellant is a mixture comprising 80 to 20 parts of dichlorodifluoromethane ($CCl_2F_2$) and 20 to 80 parts of trichloromonofluoromethane ($CCl_3F$), the preferred mixture being 35 parts of $CCl_2F_2$ and 65 parts of $CCl_3F$.

In making up the hair fixative compositions, there may be incorporated with the copolymer solutions, the additives which are customary in cosmetics, such as softening agents, perfumes, dyestuffs, gloss-producing agents or evaporation retarders and the like.

The compositions of the present invention may be applied to water-level or dry hair and spread therethrough by manipulation with the fingers or by combing so that the hair is wet with the solution. Alternatively, and with equal advantage, the setting compositions can be applied to the hair by daubing or spraying techniques. After such application, the hair is arranged to give a desired configuration in any desired manner so as to achieve a suitable coiffure. Pin curls or curlers may be employed to achieve a pre-arranged pattern. The compositions of the present invention generally facilitate arrangement of the hair being set and tend to cause it to remain relaxed in practically any shape imparted thereto. If desired, the compositions may be applied to already arranged or configured hair, although such manner of practice may not be as flexible or as completely satisfactory from an aesthetic point of view.

It will thus be seen that the objects of this invention set forth above, among those made apparent from the preceding description, are efficiently attained and, since certain changes may be made in carrying out the above method and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A neutralized terpolymer comprising from 25 to 75% by weight of vinyl pyrrolidone, from 20 to 70% by weight of an acrylate selected from the class consisting of the straight and branched $C_1$ to $C_{10}$ alkyl, cycloalkyl and aryl acrylates and methacrylates and from 3 to 25% by weight of an acrylic acid, admixed with 50 to 100% by weight based on the terpolymer of a neutralization agent selected from the class consisting of 2-amino-2-methyl-1,3-propanediol, 2-amino-2-ethyl-1,3-propanediol, and di(methoxyethyl)amine, and triethanolamine.

2. A hair fixative composition comprising a water-base solution wherein the solute comprises 2 to 10% by weight of a neutralized terpolymer of 25 to 75 parts by weight of vinyl pyrrolidone, 20 to 70 parts by weight of an acrylate selected from the class consisting of the straight and branched $C_1$ to $C_{10}$ alkyl, cycloalkyl and aryl acrylates and methacrylates and 3 to 25 parts by weight of an unsaturated acid selected from the group consisting of acrylic acid and methacrylic acid neutralized with 50 to 100% by weight based on the terpolymer of a neutralization agent selected from the class consisting of 2-amino-2-methyl-1,3- propanediol, 2-amino-2-ethyl-1,3-propanediol, and di(methoxyethyl)amine, and triethanolamine.

3. The hair fixative composition of claim 2 wherein the solvent of said solution is an alcohol.

4. The hair fixative composition of claim 2 wherein the solvent of said solution is water.

5. The hair fixative composition of claim 2 wherein the solvent is a mixture of an alcohol and water.

6. A pressurized hair fixative composition comprising 10 to 98% by weight of a water-base solution of 2 to 10% by weight, a neutralized terpolymer of 25 to 75 parts by weight of vinyl pyrrolidone, 20 to 70 parts by weight of an acrylate selected from the class consisting of the straight and branched $C_1$ to $C_{10}$ alkyl, cycloalkyl and aryl acrylates and methacrylates and 3 to 25 parts by weight of an unsaturated acid selected from the group consisting of acrylic acid and methacrylic acid neutralized with 50 to 100% by weight based on the terpolymer of a neutralization agent selected from the class consisting of 2-amino-2-methyl-1,3-propanediol, 2-amino-2-ethyl-1,3-propanediol, and di(methoxyethyl)amine, and triethanolamine admixed with 2 to 90% by weight of a hydrocarbon propellant.

References Cited

UNITED STATES PATENTS

| 2,871,161 | 1/1959 | Spiegel | 260—29.6 |
| 3,044,873 | 7/1962 | Haas | 260—80.5 |
| 3,222,329 | 12/1965 | Grosser et al. | 260—80.5 |

FOREIGN PATENTS

| 836,831 | 12/1965 | Great Britain. |

MURRAY TILLMAN, *Primary Examiner.*

W. J. BRIGGS, SR., *Assistant Examiner.*